United States Patent [19] [11] Patent Number: 4,513,388
Veendrick et al. [45] Date of Patent: Apr. 23, 1985

[54] ELECTRONIC DEVICE FOR THE EXECUTION OF A MATHEMATICAL OPERATION ON SETS OF THREE DIGITAL VARIABLES

[75] Inventors: Hendrikus J. M. Veendrick; Leonardus C. M. G. Pfennings; Johannes G. Raven; Antonius H. H. J. Nillesen, all of Eindhoven, Netherlands

[73] Assignee: U.S. Philips Corporation, New York, N.Y.

[21] Appl. No.: 601,093

[22] Filed: Apr. 16, 1984

Related U.S. Application Data

[63] Continuation of Ser. No. 305,423, Sep. 25, 1981, abandoned.

[30] Foreign Application Priority Data

Oct. 6, 1980 [NL] Netherlands ......................... 8005506

[51] Int. Cl.³ ............................................. G06F 7/38
[52] U.S. Cl. .................................... 364/736; 364/735
[58] Field of Search ................ 364/736, 735, 754, 755

[56] References Cited

U.S. PATENT DOCUMENTS 3,745,318 7/1973 Stroman ............................... 364/754
4,215,417 7/1980 Nishitani ............................. 364/736
4,297,744 10/1981 Hoffmann et al. .................. 364/754

FOREIGN PATENT DOCUMENTS 1323661 7/1973 United Kingdom .

OTHER PUBLICATIONS

Electronics Letters, 8, May 18, 1972, pp. 256–257.

Primary Examiner—Jerry Smith
Assistant Examiner—Karl Huang
Attorney, Agent, or Firm—Jack E. Haken; James J. Cannon, Jr.

[57] ABSTRACT

A device is described for electronically executing a mathematical operation, being $Z = KA + (1-K)B$. It is also described how this device or how several of such devices can be used for the design of a number of realizations, such as a recursive filter, a digital mixer etc. The basic idea is the electronic implementation of a mathematical function for binary variables.

15 Claims, 17 Drawing Figures

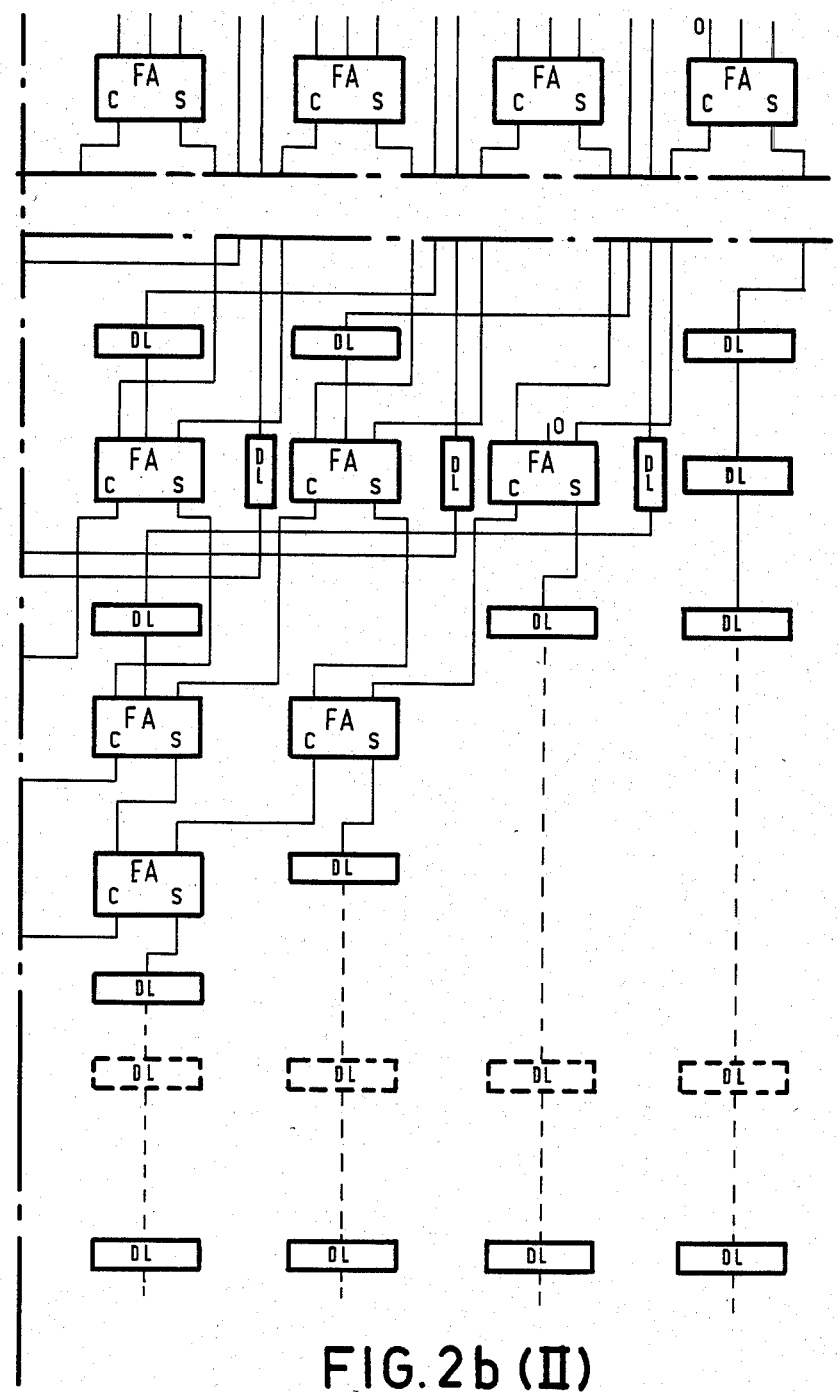
FIG. 2b (II)

| $K_{M_1}$ | $K_{M_2}$ | $Z_1$ | $Z_2$ | $Z$ |
|---|---|---|---|---|
| 0 | 0 | B | B | B |
| 1/4 | 0 | 1/4 A + 3/4 B | B | 1/8 A + 7/8 B |
| 2/4 | 0 | 2/4 A + 2/4 B | B | 2/8 A + 6/8 B |
| 3/4 | 0 | 3/4 A + 1/4 B | B | 3/8 A + 5/8 B |
| 4/4 | 0 | 4/4 A + 0 | B | 4/8 A + 4/8 B |
| 0 | 1 | B | A | 1/2 A + 1/2 B |
| 1/4 | 1 | 1/4 A + 3/4 B | A | 5/8 A + 3/8 B |
| 2/4 | 1 | 2/4 A + 2/4 B | A | 6/8 A + 2/8 B |
| 3/4 | 1 | 3/4 A + 1/4 B | A | 7/8 A + 1/8 B |
| 4/4 | 1 | 4/4 A + 0 | A | A |

FIG.6c

| | $C_{m-1}$ | $C_{m-2}$ | | $C_{m-p-1}$ | $K_0$ | B | Z |
|---|---|---|---|---|---|---|---|
| a | 0 | 0 | 0 | 0 | 1 | X | C |
| b | 0 | 0/1 | 1/0 | 0/1 | 0 | $B_b$ | $B_b$ |
| c | 1 | 0/1 | 1/0 | 0/1 | 0 | $B_c$ | $B_c$ |
| d | 1 | 1 | 1 | 1 | 1 | X | C |

$B_b$: $b_0 = \ldots\ldots b_{m-p-2} = 1$, $b_{m-p-1} = \ldots\ldots b_{m-1} = 0$ $B_c$: $b_0 = \ldots\ldots b_{m-p-2} = 0$, $b_{m-p-1} = \ldots\ldots b_{m-1} = 1$

| | | 0 | 1 | 2 | 3 | 4 | 5 | 6 | 7 | 8 | 9 |
|---|---|---|---|---|---|---|---|---|---|---|---|
| | $\overline{K_0}$ | 1 | 1 | 1 | 1 | 1 | 1 | 1 | 0 | 0 | 0 |
| | $\overline{K_n}VK_0$ | 1 | 0 | 1 | 0 | 1 | 0 | 1 | 0 | 0 | 0 |
| | $\overline{K_2}VK_0$ | 1 | 1 | 0 | 0 | 1 | 1 | 0 | 0 | 0 | 0 |
| | $\overline{K_1}VK_0$ | 1 | 1 | 1 | 1 | 0 | 0 | 0 | 0 | 0 | 0 |
| $L = 1-K$ | $L_n$ | 0 | 1 | 0 | 1 | 0 | 1 | 0 | 1 | 0 | 1 |
| | $L_2$ | 0 | 1 | 1 | 0 | 0 | 1 | 1 | 0 | 0 | 0 |
| | $L_1$ | 0 | 1 | 1 | 1 | 1 | 0 | 0 | 0 | 0 | 1 |
| | $L_0$ | 1 | 0 | 0 | 0 | 0 | 0 | 0 | 0 | 0 | 0 |
| | $K_0$ | 0 | 0 | 0 | 0 | 0 | 0 | 0 | 1 | 1 | 1 |
| | $K_nVK_0$ | 0 | 1 | 0 | 1 | 0 | 1 | 0 | 1 | 1 | 1 |
| | $K_2VK_0$ | 0 | 0 | 1 | 1 | 0 | 0 | 1 | 1 | 1 | 1 |
| | $K_1VK_0$ | 0 | 0 | 0 | 0 | 1 | 1 | 1 | 1 | 1 | 1 |
| K | $K_n$ | 0 | 1 | 0 | 1 | 0 | 1 | 0 | 1 | 0 | 1 |
| | $K_2$ | 0 | 0 | 1 | 1 | 0 | 0 | 1 | 1 | 0 | 1 |
| | $K_1$ | 0 | 0 | 0 | 0 | 1 | 1 | 1 | 1 | 0 | 1 |
| | $K_0$ | 0 | 0 | 0 | 0 | 0 | 0 | 0 | 0 | 1 | 1 |

FIG. 9

ELECTRONIC DEVICE FOR THE EXECUTION OF A MATHEMATICAL OPERATION ON SETS OF THREE DIGITAL VARIABLES

This is a continuation of application Ser. No. 305,423, filed Sept. 25, 1981 abandoned.

BACKGROUND OF THE INVENTION

The invention relates to a device for electronically executing a mathematical operation which can be executed on at the most three digital variables, two of which comprise m bits each and represent the input signals (A and B), a third variable (K) representing a weighting factor which comprises (n+1) bits (n≧0), the mathematical operation performed on said digital variables being of the kind $K \cdot A + (1-K) \cdot B$, the result $Z = K \cdot A + (1-K) \cdot B$ thereof representing the digital output signal which is formed by the bit-wise execution of the mathematical operation, a partial output signal $Z_{ij} = K_i a_j + (1-K_i) b_j$ being obtained per bit coefficient of $A(a_j)$ and $B(b_j)$ and $K(K_i)$.

Electronic execution of mathematical operations such as additions and multiplications is known. For the execution of a combination of two or more mathematical operations it is known to execute these operations consecutively in time and to use specific means for each operation. For example, in the case of recursive digital filters where an operation of the kind $$y(n) = \sum_{i=0}^{N} a_i x(n-i) - \sum_{i=1}^{N} b_i y(n-i)$$

is to be realized, it is customary to perform the multiplication operation first, followed by the add and/or subtract operations. This requires elements such as multipliers and adders. Such an arrangement for a recursive digital filter is described on pages 40 to 46 and page 306 of the book "Theory and application of digital signal processing", by L. R. Rabiner and B. Gold, published by Prentice Hall Inc. Englewood Cliffs, N.J., U.S.A.

Due to the successive execution of the various mathematical operations in time, the processing time required is determined by the sum of the individual processing times. Moreover, the use of separate elements for the operations is an inefficient and expensive method. It is to be noted that it is also possible, of course, to use the same unit, under the control of its program, for several operations in the case of programmed processor units, but this generally requires a longer processing time. A long processing time may be a drawback, for given applications. This is the case, for example, for digital video signal processing where frequencies in the order of 35 MHz are already used in some cases. A circuit which is operational at such a frequency, therefore, offers a solution in this field of application.

SUMMARY OF THE INVENTION

It is an object of the invention to provide a novel approach to the execution of mathematical operations where notably a number of operations can be simultaneously executed.

It is another object of the invention to realize these mathematical operations with fewer elements and in a faster and simpler manner.

To this end, the device of the kind set forth is characterized in that said partial output signal is formed by one circuit (Y) within one period, all electronic circuits which form the partial output signals for the various bits of A, B and K being arranged as matrix elements $Y_{ij}$ of an $(n+1) \times m$ matrix, the bit value of the coefficient of the zero order bit $(K_0)$ of the weighting factor K being applied directly to all said elements $(Y_{ij})$ of one of the rows (or columns) of the matrix, the bit value of the other bit order coefficients of K each being applied, via a logic gate, to all elements of one row (or one column) of the matrix, each of said other bit order coefficients being applied to a first input of one logic gate, said zero order coefficient of K also being applied to a second input of each logic gate in order to obtain a realization in the form of $$K = (K_1 \vee K_0)2^{-1} + (K_2 \vee K_0)2^{-2} + \ldots + (K_n \vee K_0)2^{-n} + K_0 2^{-n}$$

(in which V stands for the mathematical "OR") for the variable K, the partial output signals $(Z_{ij})$ of each circuit (Y) being applied to full adders which serve to sum all said partial output signals in order to obtain the output signal (Z).

Such a universal module is thus realized. The multiplication, inversion and addition operations are executed by means of one circuit Y within one period which consists of two clock phases. Also present are a number of full adders which add the various partial output signals, thus determining the output signal. These full adders utilize the same logic and clock phases as the elements Y. The device in accordance with the invention is preferably realized as one module, which is also referred to as a chip. Furthermore, the device in accordance with the invention can be used for several different purposes by utilizing several devices in accordance with the invention which are preferably accommodated on one or more chips.

The device in accordance with the invention also offers a favorable solution for the design of an adder for at the most two operands, in that said weighting factor K assigns the same weight to both input signals for this adding operation. This is simply realized, for example, by restricting the weighting factor K to a fixed value.

The device in accordance with the invention also represents an attractive solution for the design of an adder for more than two operands, in which case it is characterized in that several of said devices are used in order to obtain a sum of more than two input signals, the same value being assigned to all said several devices by the weighting factor. This is because the combining of several devices is simple.

The device in accordance with the invention also offers a favorable solution for the design of an m×n bit multiplier in that at least one of the input signals is assumed to be zero, so that said output signal is $Z = KA$ or $Z = (1-K)B$. The weighting factor K then acts as the multiplier and A or B as the multiplicand.

The device in accordance with the invention also offers a favorable solution for the design of an $(m-r) \times (n+1)$ bit multiplier in that at least one of the input signals is assumed to be zero, in that several of said devices are used, and in that a fraction, that is to say the r (r∈N) bits of highest order, of the m-bit input signal applied to a first one of said devices is not active, the r bits of the next order being applied to at least one of said 1 further devices, that is to say to the inputs of the r bits of highest order of said devices, the output signal of said first device being added to the sum of the output signals of said 1 further devices.

This is advantageous if the multiplier is composed of a large number of bits and the multiplicand is composed of a small number of bits.

A device in accordance with the invention also offers a favorable solution for the design of a multiplexer in that the weighting factor K alternately assumes its two extreme values, and hence alternatively supplies the input signals (A and B) as its output signal. This effect can be utilized when the input signals originate from a device whose operational frequency is lower than that of the device whose operational frequency is lower than that of the device in accordance with the invention. The latter device then acts as a switch as if it were.

A device in accordance with the invention also offers a favorable solution for the design of a digital mixer in that use is made of one or more of said devices, the input signals being applied to several of said devices, the output signals of said several devices being added. This offers a solution if a resolution is required which is higher than the value which can be obtained by means of a single device.

The device in accordance with the invention also offers a favorable solution for the design of a limiter in that one bit suffices for the weighting factor K and, if more bits are present, the latter are assumed to be zero, the value of said zero order bit being determined by the value of the coefficients of the most significant bits of the input signal, the second input signal of said input signal being completely determined by the first input signal. This is an attractive solution because the device can be simply blocked and unblocked.

The device in accordance with the invention offers a favorable solution for the design of a recursive digital filter in that the determination of a fraction of the time delayed output signal and the addition are performed in one operation. This is because a recursive relation can be simply realized by means of the device. A filter of this kind is used, for example, as a noise suppressor in digital video processing.

Preferably, all said elements (Y), gates (G), full adders (FA) and connections are constructed in accordance with the integrated circuit technique. This is a suitable technique.

Preferably, all said elements (Y), gates (G), full adders (FA) and connections are constructed according to the NMOS technology.

BRIEF DESCRIPTION OF THE FIGURES

The invention will be described in detail hereinafter with reference to a number of Figures.

FIG. 6c shows the output signal of such a digital mixer in the form of a table.

FIG. 9 shows a table with the coefficients $K_i$ and $1-K_i = V_i$, $K_i$, $K_i \vee K_0$ and $\overline{K_i \vee K_0}$.

DESCRIPTION OF THE PREFERRED EMBODIMENT

Mathematics

Figure 1A:
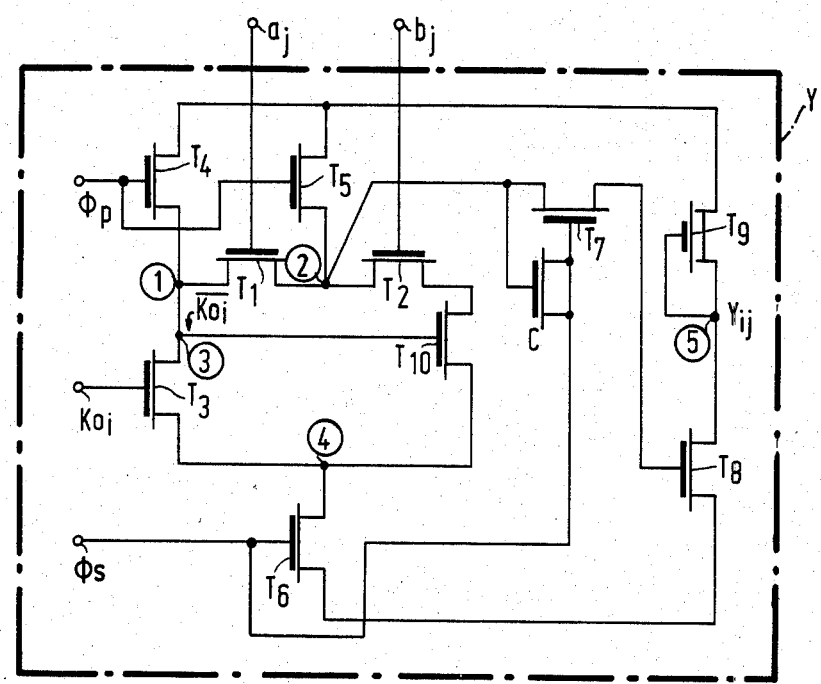
FIG. 1a shows an example of electronic realization of a partial output signal $Y_{ij}$.

A mathematical expression can be converted by mathematical manipulation so that the relevant function can be simply electronically realized by means of a universal module. For example, the expression $$Z = K^1 q^{-1} A + (1 - K^1 q^{-1})B \qquad (2)$$

$$\begin{aligned} Z &= KA + (1-k)B \text{ where } K = K'/q \\ &= KA + LB \text{ where } L = 1 - K \end{aligned} \qquad (2')$$

can be elaborated by means of a digital processor. In this expression, A and B are input variables which both have a value of m bits. K is a weighting factor. Furthermore, $q = 2^n$, a positive power of two ($m \in \mathbb{N}$) and $0 \leq K' \leq q$, where $K' \in \mathbb{Z}^+$. There may be cases where it is necessary to use one of the two extreme values of K, being $K=0$ and $K=1$. This is the case if one of the two input variables A or B receives the maximum weight. For example, assume that the input variable A obtains the maximum weight; K must then be 1 and $1-K=1-1=0$, and $Z=1 \cdot A + 1 \cdot B = A$. If K has a resolution $1/q$, $$K = K_0 2^0 + K_1 2^{-1} + K_2 2^{-2} + K_3 2^{-3} \ldots + \qquad (3)$$

$$K_{n-1} 2^{-n+1} + K_n 2^{-n}$$

in which case $(n+1)$ bits are required for realizing all values, including the extreme values. The value $K=1$ can then be obtained by assuming the zero order bit to be $K_0=1$ and all other $K_i=0$. However, this leads to an inefficient use of the most significant bit value, being $2^0$, which is used only when $K=1$ and is always zero for the remainder.

A further possibility of obtaining $K=1$ without this inefficient use consists of $$K = (K_1 \vee K_0)2^{-1} + (K_2 \vee K_0)2^{-2} + \ldots + \qquad (4)$$

$$(K_n \vee K_0)2^{-n} + K_0 2^{-n}$$

This is achieved by omitting the most-significant bit value $K_0 2^0$ in relation (3) and by adding $K_0 2^{-n}$, being the product of $K_0$ with the least significant bit value, to the other terms, and by multiplying the other bit values, $2^{-i}$, by $(K_i \vee K_0)$ as a coefficient. If the value $K=1$ is required, $K_0=1$. In that case, the other $K_i$ values are suppressed by the $K_0$ value, so $$K = 1 = K_0 2^{-1} + K_0 2^{-2} + \ldots + K_0 2^{-n+1} + K_0 2^{-n} + K_0 2^{-n}$$

$$= 1 \times 2^{-1} + 1 \times 2^{-2} + \ldots +$$

-continued $$1 \times 2^{-n+1} + 1 \times 2^{-n} + 1 \times 2^{-n}$$

If $K \neq 1$, $K_0 = 0$ so that $$K = K_1 2^{-1} + K_2 2^{-2} + \ldots + K_n 2^{-n} + K_0 2^{-n},$$

or written out $$= K_1 2^{-1} + K_2 2^{-2} + \ldots + K_n 2^{-n}$$

The last term $K_0 2^{-n}$ is thus eliminated, because $K_0 = 0$ and all other bit values $2^{-i}$ are multiplied by the relevant coefficient $K_i$. When K is written in this manner, the bit value $2^0$ is no longer necessary and the value $K = 1$ can still be obtained by a more efficient use of the other bit values $2^{-i}$.

In digital representation it will be clear that K and $(1-K)$ are the inverse of one another, because $K + (1-K) = 1$ or $\overline{K} = (1-K)$. Consequently, $1-K$ can be written in the same way as K.

$$L = 1 - K = \overline{(K_1 \vee K_0)} \, 2^{-1} + \overline{(K_2 \vee K_0)} \, 2^{-2} + \ldots + \overline{(K_n \vee K_0)} \, 2^{-n} + \overline{K}_0 2^{-n} \tag{5}$$

FIG. 9 shows the coefficients $K_i$ and $1 - K_i = L_i$ for the two notations of K (according to the expressions (3) and (4). FIG. 9 shows that if $K_0 = 0$, the value of $(K_i \vee K_0)$ is the same as the value of $K_i$. If $K_0 = 1$, the values of the other $K_i$ are suppressed by the value of $K_0$ and, consequently, the value of $(K_i \vee K_0)$ will be 1, regardless of the value of $K_i$. A similar reasoning applies to $L_i$ and $\overline{K_i \vee K_0}$.

Thus, the function $Z = KA + (1-K)B$ can be bitwise written as partial functions $Y_{(ij)} = (K_i \vee K_0)a_j + \overline{(K_i \vee K_0)} b_j$, in which $K_i$ is the coefficient of the $i^{th}$ bit of K and $a_j$, $b_j$ the coefficient of the $j^{th}$ bit of A, B. This function is then written as $Z = \Sigma Y_{ij}$. The different $Y_{ij}$ values are then added in accordance with their relevant significance level. Because $(K_i \vee K_0)$ and $\overline{(K_i \vee K_0)}$ are the binary opposite of one another, it will be clear that if $(K_i \vee K_0) = "1"$ $\overline{(K_i \vee K_0)} = 0$ and vice versa. Thus, the result of such a $Y_{ij}$ is either $(K_i \vee K_0)a_j$ or $\overline{(K_i \vee K_0)} b_j$.

THE ELECTRONIC REALIZATION

The function $Z = KA + LB$ can now be simply electronically realized thanks to the described mathematical manipulations.

FIG. 1a shows an example of an electronic realization of a partial function $Y_{ij} = (K_i \vee K_0)a_j + \overline{(K_i \vee K_0)} b_j$, which represents the partial output signal Yij. In this example, the circuit is realized by using NMOS technology. The circuit comprises ten transistors $T_1$ to $T_{10}$, only the transistor $T_9$ being a depletion transistor while all other transistors are enhancement transistors. Furthermore, the letter C denotes a capacitor and the numbers ①, ②, ③, ④, and ⑤ denote junctions. The value of the $j^{th}$ bit of the input signals A and B is applied to the inputs $a_j$ and $b_j$. Furthermore, the circuit "sees" $K_0$ or one of the coefficients $K_i$, depending on the value of $K_0$, as described in the mathematical considerations. The value of the coefficients of K as seen by the circuit is denoted by $K_{0i}$ in the Figure. On an output, junction ⑤ of this circuit, referred to as the Y circuit, the result $Y_{ij} = K_{0i}a_j + \overline{K_{0i}}b_j$ is presented.

Figure 1B:
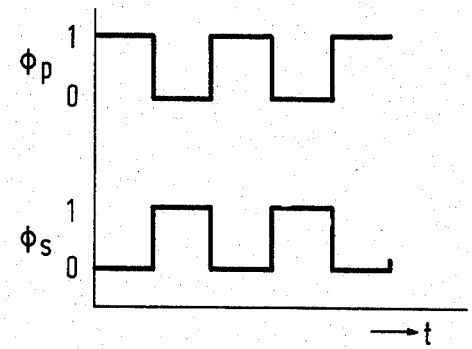
FIG. 1b shows the variation of the clock signal for the Y circuit.

The circuit receives a clock signal having two phases, i.e. $\Phi_p$ (pre-charge) and $\Phi_s$ (sampling). The variation of the clock signal is shown in FIG. 1b. Furthermore, only the value $K_{0i}$ is presented to an input of the circuit; the inverse value $\overline{K_{0i}}$ is generated by the circuit itself at the junction ③. The generating of $\overline{K_{0i}}$ may cause a voltage drop in given circumstances. For example, at the junction ② immediately after the appearance of $\Phi_s$.

In order to compensate for this voltage drop, the bootstrap capacitor C is used. As a result, the potential of the junction is increased to a higher value. The use and the function of such a bootstrap capacitor are described in detail in U.S. patent application Ser. No. 269,107, filed June 1, 1981 and assigned to the assignee of this application. If $\Phi_p$ is high, i.e. during the pre-charge phase, the junctions ① and ② are precharged. If $\Phi_s$ is high, i.e. during the sampling phase, the product $(K_{0i}a_j)$ or $(K_{0i}b_j)$ is formed on the junction ④, depending on the logic value of $K_{0i}$ and the logic value of $a_j$ and $b_j$. The circuit may thus be considered as a switch as if it were (The inverse value is a consequence of the use of NMOS technology). Because $\Phi_s$ is high, the product formed on junction ④ is applied to the junction ⑤ in inverted form. The result $Y = \overline{K_{0i}}a_j$ or $Y = \overline{K_{0i}}b_j$ is thus applied to the junction ⑤. Due to this realization, one output suffices for the function Y formed.

Figure 2A:
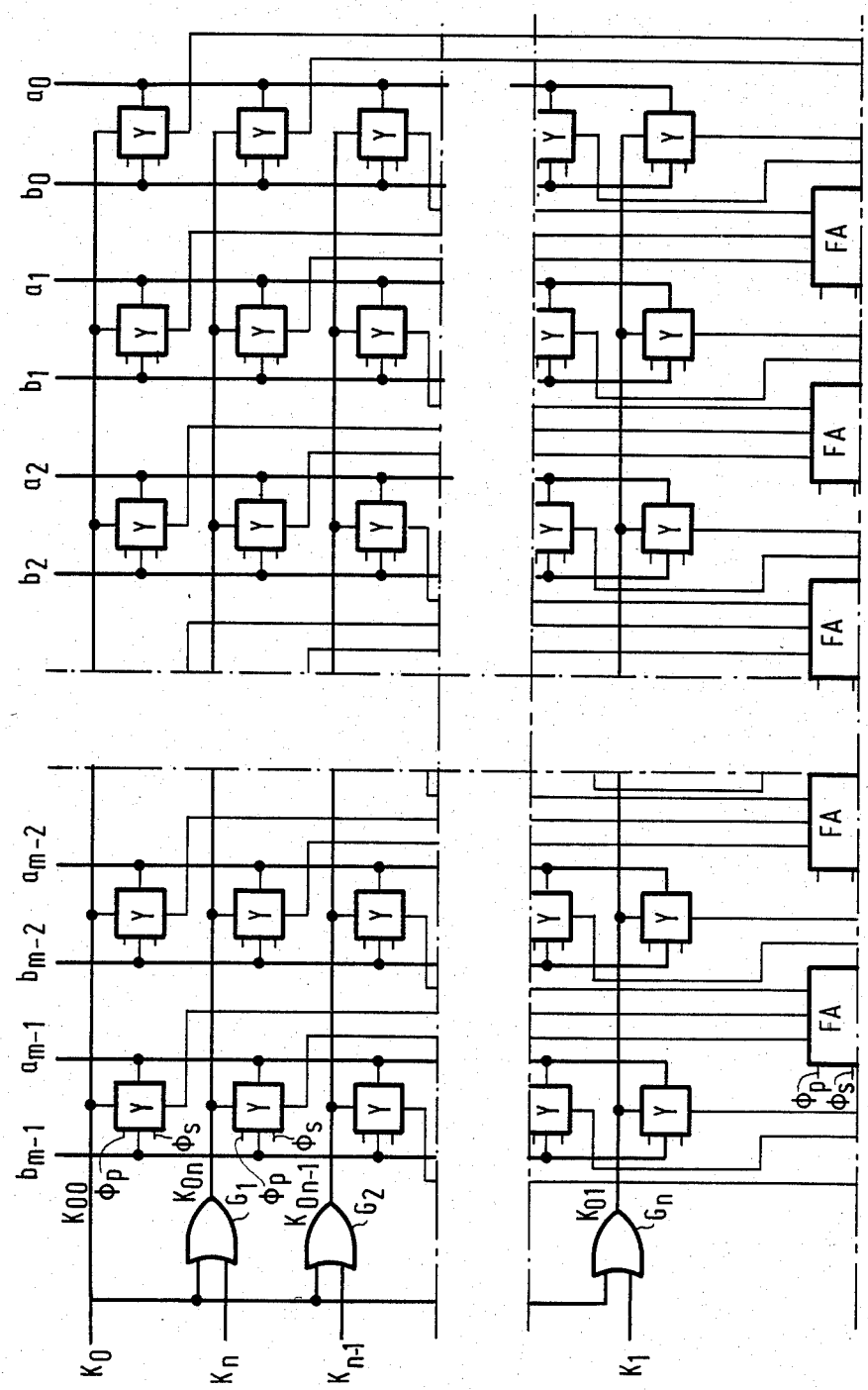
FIGS. 2a and 2b show an electronic realization of the output signal $Z = KA + (1-K)B$.

FIGS. 2a and b show a realization of $Z = KA + (1-K)B$ by using a first electronic device according to the invention. The Ys represent the various Y circuits as described with reference to FIG. 1a; FAs represent the full adders, G1, G2, ..., Gn represent logic OR-gates, and $\Phi_p$ and $\Phi_s$ represent the clock phase signals. As the already been described in the mathematical considerations, this function is formed by $$Z = \sum_{i,j} Y_{ij} \tag{6}$$

$$= \sum_{i=0}^{n} \sum_{j=0}^{(m-1)} (K_i \vee K_0)a_j + \overline{(K_i \vee K_0)} b_j$$

This may thus be considered as a sum of two products of an $m \times (n+1)$ matrix and an $(n+1) \times m$ matrix.

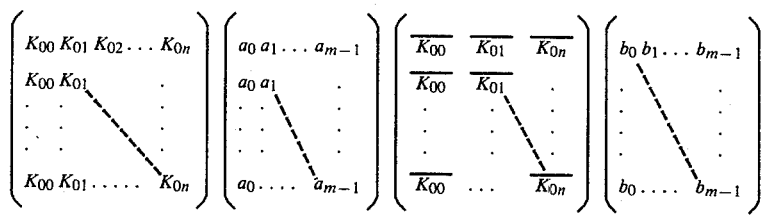

The circuit in order to obtain the function Z thus obtains a matrix structure. In the rows, the $K_{0i}$ coefficient of K is thus present as if it were and in the columns the coefficients $a_j$ and $b_j$ of A and B. FIG. 2a show this arrangement. This circuit will be referred to hereinafter (FIGS. 2a and 2b) as matrix circuit.

Figure 2B:
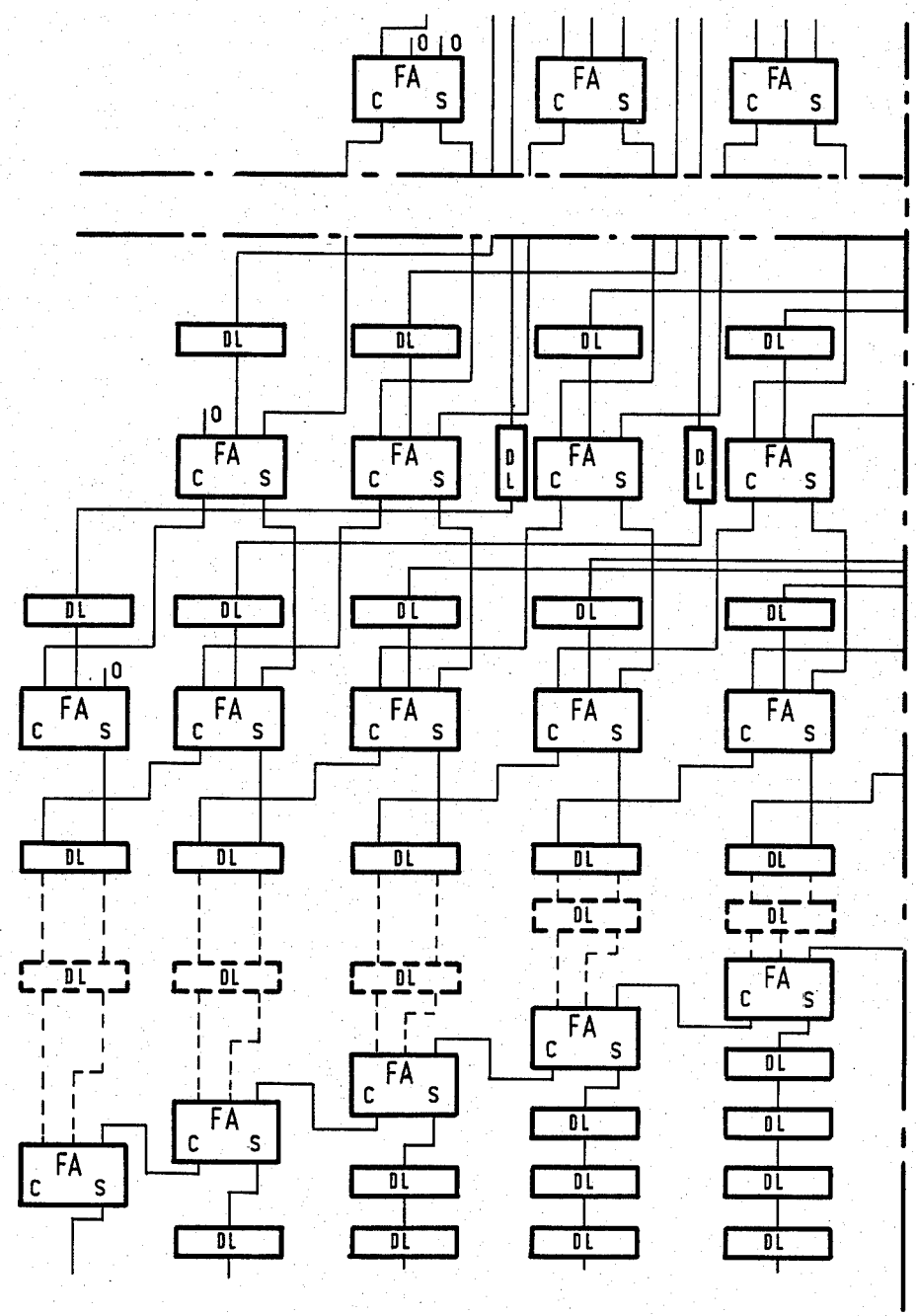

The electronic realization of the coefficients ($K_i$ V $K_0$) of K of the formulae (4) is obtained by means of the OR-gates G1, G2, ... Gn. If $K_0=1$, the value "1" will be applied to each $K_{0i}$ input of the Y circuits. If $K_0=0$, the value "0" will be applied to the $K_{00}$ input of all Y circuits of the first row. The added element $K_0 2^{-n}$ in the formula (4) thus has the value 0 in this case. The elements Y of the other rows then receive $K_i$ on their $K_{0i}$-input via the logic OR-gates. The elements Y furthermore receive the input signals $a_j$ and $b_j$, each time one bit of A and B per column. Obviously, the rows and columns are interchangeable. The output of each Y circuit is connected to an input of a full adder as shown in FIG. 2b. The same logic and technology as used for the Y circuits is used for the well-known full adders (FA). The full adders are interconnected in known manner.

The sum output (output S) of a full adder is connected to an input of a full adder of the next row of full adders in the same column. The carry output (output C) of a full adder is connected to an input of a full adder of the next row of full adders, but in a next column associated with a higher bit order of the input signals. The delay elements (DL) serve to synchronize the input and output signals of the various full adders with the clock pulse. These clock signals $\Phi_p$ and $\Phi_s$ are alternately inverted per row of full adders, so that the flow rate of the data stream can be doubled. Because $\Phi_p$ and $\Phi_s$ are the inverse of one another, one row of full adders will thus be in the sampling phase and the subsequent row of full adders will be in the precharge phase. In other words, said subsequent row is being "prepared", while the said row is being dealt with. During the next phase, said subsequent row can be dealt with. The processing of the signals is thus substantially faster. At the end of each column of full adders, the output signal Z is output bitwise. The full adders thus perform the summing over all bits i of K and j of A and B as stated in the expression (6).

APPLICATIONS

The matrix circuit can be used for many purposes. Hereinafter, a non-exhaustive series of possibilities utilizing one or more matrix circuits will be described.

(1) A very obvious application is the use of the matrix circuit as an m×m bit adder. It is to be noted that the input signals A and B need not necessarily consist of the same number of bits. However, if they contain a different number of bits, signals consisting of the same number of bits can still be applied to the matrix circuit by the addition of suitable bit value coefficients to the input signal containing the smallest number of bits. The function to be realized is $Z=\frac{1}{2}A+\frac{1}{2}B$ or $Z'=2Z=A+B$, which simply corresponds to moving one order higher in the binary system (compare the shifting of the decimal point in the decimal system).

The value $K=\frac{1}{2}$ and $L=1-K=\frac{1}{2}$ is obtained by assuming $K_1$ to be equal to 1 (last row of FIG. 2a), and all other $K_i=0$. Inserted in the expression (4) for K, this results in $$K = (K_1 \vee K_0) 2^{-1} + (K_2 \vee K_0) 2^{-2} + \ldots +$$
$$(K_n \vee K_0) 2^{-n} + K_0 2^{-n}$$

$$K = 1 \cdot 2^{-1} + 0 \cdot 2^{-2} + \ldots 0 \cdot 2^{-n} + 0 \cdot 2^{-n}$$
$$= \frac{1}{2}$$

In the expression (5) for $L=1-K$, this results $$L = \overline{(K_1 \vee K_o)} \, 2^{-1} + \overline{(K_2 \vee K_o)} \, 2^{-2} + \ldots +$$
$$\overline{(K_n \vee K_0)} \, 2^{-n} + \overline{K_0} 2^{-n}$$
$$= 0 \cdot 2^{-1} + 1 \cdot 2^{-2} + \ldots + 1 \cdot 2^{-n} + 1 \cdot 2^{-n}$$
$$= \frac{1}{2}$$

Figure 3:
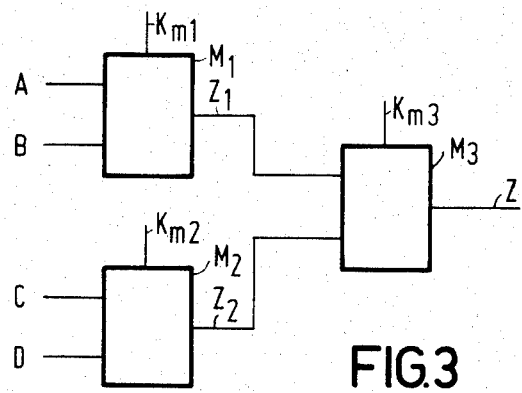
FIG. 3 shows an example of an adder for four input signals which utilizes several matrix circuits.

FIG. 3 shows an example of a second electronic device for executing on two sets of three digital variables, namely a first set A, B, $K_{m1}$ and a second set C, D, $K_{m2}$, first mathematical operations of the kind:

$$Z_1 = K_{m1}A + (1-K_{m1})B,$$
$$Z_2 = K_{m2}C + (1-K_{m2})D,$$

and a second mathematical operation of the kind:
$$[K_{m1}A+(1-K_{m1})B]+[K_{m2}C+(1-K_{m2})D],$$

by using matrix circuits.

The electronic device shown in FIG. 3 is stagewise organized and comprises a first stage which comprises the matrix circuits $M_1$ and $M_2$, and a second stage which comprises the matrix circuit $M_3$. The first mathematical operations is executed by the first stage, namely matrix circuit $M_1$ executes the first mathematical operation in order to obtain $Z_1$ and matrix circuit $M_2$ executes the first mathematical operation in order to obtain $Z_2$.

The second mathematical operation, the addition $Z_1+Z_2$, is executed by the second stage. Therefore matrix circuit $M_3$ has to be used as an adder. Just like in the described case utilizing one matrix circuit, $K_{m3}=\frac{1}{2}$.

Assume for purposes of discussion that $$K_{m1}=K_{m2}=K_{m3}=\frac{1}{2}.$$

The output signal of M1 is then $$Z_1=\tfrac{1}{2}A+\tfrac{1}{2}B$$

The output signal of M2 is then $$Z_2=\tfrac{1}{2}C+\tfrac{1}{2}D.$$

The output signal of M3 is then $$Z = 1/2 Z_1 + 1/2 Z_2$$
$$Z = 1/4A + 1/4B + 1/4C + 1/4D \rightarrow 4Z = A + B + C + D$$

In a second electronic device according to the invention, said first mathematical operation $Z_p=K_pA_p+(1-K_p)B_p$ is executed by a dedicated matrix circuit $M_p$ for a set of digital variables ($A_p$, $B_p$, $K_p$). Said second mathematical operation which is of the kind $\Sigma_p K_p A_p + (1-K_p) B_p$ is executed by an adder means which is preferably implemented by one or more matrix circuits, depending on the number p of digital output signals $Z_p$ of the first stage. In this case, a move to two orders higher takes place.

(2) The matrix circuit can also be used as an m×n bit multiplier. This is realized by assuming one of the two input signals, either A or B, to be equal to zero. The function to be realized is then either $Z=KA$ or $Z=(1-K)$ B. It is also possible to obtain an $(m-1r)\times(n+1r)$ bit multiplier by using several matrix circuits. This means that the reduction of the number of bits of the input signal, i.e. from m bits to $(m-1r)$ bits, increases the number of bits of the weighting factor K, i.e. by a multiple 1 of the number of bits r whereby the input signal was reduced.

Figure 4A:
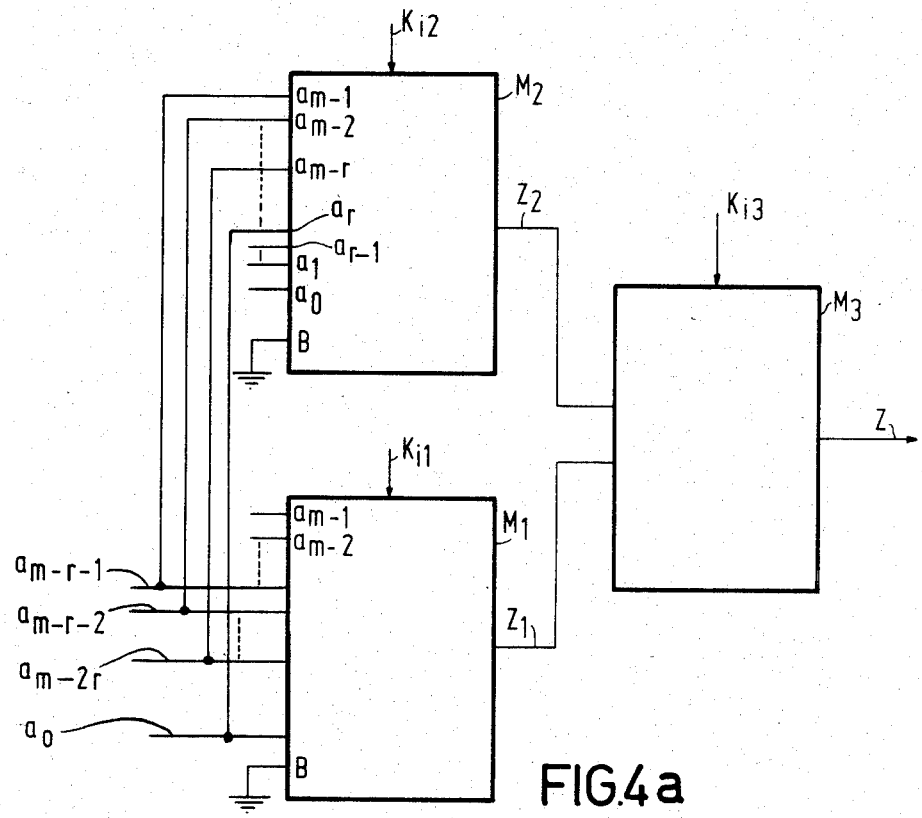
FIG. 4a shows an embodiment of an $(m-r) \times (n+r)$ bit multiplier.

FIG. 4a shows an example of a feasible realization of an $(m-r)\times(n+r)$ multiplier by using a second electronic device according to the invention. This $(m-r)\times(n+r)$ multiplier comprises a first stage which comprises the matrix circuits $M_1$ and $M_2$, and a second stage which comprises the matrix circuit $M_3$. For the sake of clarity, The B input signal is assumed to be equal to zero. In the matrix circuit M1, only the bits $a_0$ to $a_{m-r-1}$ of A are used. The bit coefficients $a_0$ to $a_{m-r-1}$ of the input signal A are also applied to the bit inputs $a_r$ to $a_{m-1}$ of the matrix circuit $M_2$. The bits $a_0$ to $a_{m-r-1}$ are thus shifted r orders higher or r bits. This set-up will be described hereinafter with reference to a simple example.

The matrix circuit $M_3$ may be used, for example, as a customary adder where $K_{13}$ is assumed to be 1 and all $K_{i3}=0$. The result $Z_1=K_1A$ is output on an output $Z_1$ of matrix circuit $M_1$, where $$Z_1 = \sum_{i=0}^{n} \sum_{j=0}^{m-r-1} (K_{i1} \lor K_{01}) 2^{-i} (a_j 2^j)$$

On an output $Z_2$ of matrix circuit $M_2$ the result $Z_2=K_2A'$ is output, where $$Z_2 = \sum_{i=0}^{n} \sum_{j=0}^{m-r-1} (K_{i2} \lor K_{02}) 2^{-i} a_j 2^{j+r}$$

The results $Z_1$ and $Z_2$ are then applied to the inputs of the matrix circuit $M_3$. Because $M_3$ is chosen as the adder in this example, the result on the output of $M_3$ is $Z=\frac{1}{2}Z_1+\frac{1}{2}Z_2$ or $2Z=Z_1+Z_2$.

$$2Z = \sum_{i=0}^{n} \sum_{j=0}^{m-r-1} (K_{i1} \lor K_{01}) 2^{-i} (a_j 2^j) +$$

$$\sum_{i=0}^{n} \sum_{j=0}^{m-r-1} (K_{i2} \lor K_{02}) 2^{-i} a_j 2^{j+r}$$

This can also be written as $$2Z = \sum_{i=0}^{n} \sum_{j=0}^{m-r-1} (K_{i1} \lor K_{01}) 2^{-i} (a_j 2^j) +$$

$$\sum_{i=0}^{n} \sum_{j=0}^{m-r-1} (K_{i2} \lor K_{02}) 2^{-i+r} (a_j 2^j)$$

where a part, that is to say r, of the exponent of 2 associated with $a_j$ benefits the exponent of 2 associated with $(K_{i2} \lor K_{o2})$; the latter then becomes $-i+r$. The expression for 2Z can also be written as $$2Z = \sum_{i=0}^{n} \sum_{j=0}^{m-r-1} [(K_{i1} \lor K_{01}) 2^{-i} + (K_{i2} \lor K_{02}) 2^{-i+r}] (a_j 2^j)$$

$$= \sum_{i=0}^{n} \sum_{j=0}^{m-r-1} [(K_{i1} \lor K_{01}) + (K_{i2} \lor K_{02}) 2^r] 2^{-i} (a_j 2^j)$$

It follows therefrom that the result on the output of the matrix circuit $M_3$, being $Z=K\times A$, produces an $(n+r)$ bit number for K and an $(m-r)$ bit number for A.

This reasoning will be described hereinafter with reference to a simple example in which $K=3$ bits and $A=4$ bits, r being 1.

$K_1 = (K_{11} \lor K_{01})2^{-1} + (K_{21} \lor K_{01})2^{-2} + K_{01} 2^{-2}$ $K_2 = (K_{12} \lor K_{02})2^{-1} + (K_{22} \lor K_{02})2^{-1} + K_{02} 2^{-2}$ $A = a_0 2^0 + a_1 2^1 + a_2 2^2 + O\ 2^3$ (input signal for)$M_1$ $A' = a_2 2^3 + a_1 2^2 + a_0 2^1 + O\ 2^0$ (input signal for)$M_2$ $Z_1 = K_1 A$ $= [(K_{11} \lor K_{01})2^{-1} + (K_{21} \lor K_{01})2^{-2} + K_{01} 2^{-2}]$ $[a_0 2^0 + a_1 2^1 + a_2 2^2]$ $= (K_{11} \lor K_{01})2^{-1} a_0 2^0 + (K_{21} \lor K_{01})2^{-2} a_0 2^0 +$ $K_{01} 2^{-2} a_0 2^0 + (K_{11} \lor K_{01})2^{-1} a_1 2^1 +$ $(K_{21} \lor K_{01})2^{-2} a_1 2^1 + K_{01} 2^{-2} a_1 2^1 +$ $(K_{11} \lor K_{01})2^{-1} a_2 2^2 +$ $(K_{21} \lor K_{01})2^{-2} a_2 2^2 + K_{01} 2^{-2} a_2 2^2$ $Z_2 = K_2 A^1$ $= [(K_{12} \lor K_{02})2^{-1} + (K_{22} \lor K_{02})2^{-2} + K_{02} 2^{-2}]$ $[a_2 2^3 + a_1 2^2 + a_0 2^1]$ $= (K_{12} \lor K_{02})2^{-1} a_2 2^3 + (K_{22} \lor K_{02})2^{-2} a_2 2^3 +$ $K_{02} 2^{-2} a_2 2^3 + (K_{12} \lor K_{02})2^{-1} a_1 2^2 +$ $(K_{22} \lor K_{02})2^{-2} a_1 2^2 + K_{02} 2^{-2} a_1 2^2 +$ $(K_{12} \lor K_{02})2^{-1} a_0 2^1 +$ $(K_{22} \lor K_{02})2^2 a_0 2^1 + K_{02} 2^{-2} a_0 2^1$ $= (K_{12} \lor K_{02})2^0 a_2 2^2 + (K_{22} \lor K_{02})2^{-1} a_2 2^2 +$ $K_{02} 2^{-1} a_2 2^2 + (K_{12} \lor K_{02})2^0 a_1 2^1 +$ $(K_{22} \lor K_{02})2^{-1} a_1 2^1 + K_{02} 2^{-1} a_1 2^1 +$ $(K_{12} \lor K_{02})2^0 a_0 2^0 + (K_{22} \lor K_{02})2^{-1} a_0 2^0 +$ $K_{02} 2^{-1} a_0 2^0$ $Z = Z_1 + Z_2$ $= (K_{11} \lor K_{01})2^{-1} a_0 2^0 + (K_{21} \lor K_{01})2^{-2} a_0 2^0 +$ $K_{01} 2^{-2} a_0 2^0 + (K_{11} \lor K_{01})2^{-1} a_1 2^1 +$ $(K_{21} \lor K_{01})2^{-2} a_1 2^1 + K_{01} 2^{-2} a_1 2^1 +$ $(K_{11} \lor K_{01})2^{-1} a_2 2^2 + (K_{21} \lor K_{01})2^{-2} a_2 2^2 +$ $K_{01} 2^{-2} a_2 2^2 + (K_{12} \lor K_{02})2^0 a_2 2^2 +$ $(K_{22} \lor K_{02})2^{-1} a_2 2^2 + K_{02} 2^{-1} a_2 2^2 +$ $(K_{12} \lor K_{02})2^0 a_1 2^1 +$ $(K_{22} \lor K_{02})2^{-1} a_1 2^1 + K_{02} 2^{-1} a_1 2^1 +$ $(K_{12} \lor K_{02})2^0 a_0 2^0 +$ -continued $$(K_{22} \lor K_{02})2^{-1} a_0 2^0 + K_{02} 2^{-1} a_0 2^0$$

$$= [(K_{11} \lor K_{01})2^{-1} + (K_{12} \lor K_{02})2^0] a_0 2^0 +$$

$$[(K_{21} \lor K_{01})2^{-2} + (K_{22} \lor K_{02})2^{-1}] a_0 2^0 +$$

$$(K_{01} 2^{-2} + K_{02} 2^{-1}) a_0 2^0 +$$

$$[(K_{11} \lor K_{01})2^{-1} + (K_{12} \lor K_{02}2^0] a_1 2^1 +$$

$$[(K_{21} \lor K_{01})2^{-2} + (K_{22} \lor K_{02})2^{-1}] a_1 2 +$$

$$(K_{01} 2^{-2} + K_{02} 2^{-1}) a_1 2^1 +$$
$$[(K_{11} \lor K_{01})2^{-1} + (K_{12} \lor K_{02})2^0] a_2 2^2 +$$

$$[(K_{21} \lor K_{01})2^{-2} + (K_{22} \lor K_{02})2^{-1}] a_2 2 +$$

$$(K_{01} 2^{-2} + K_{02} 2^{-1}) a_2 2^2$$

$$= [(K_{12} \lor K_{02})2^0 + (K_{11} \lor K_{01})2^{-1}] [a_0 2^0 + a_1 2^1 + a_2 2^2] +$$

$$[(K_{22} \lor K_{02})2^{-1} + (K_{21} \lor K_{01})2^{-2}] [a_0 2^0 + a_1 2^1 + a_2 2^2] +$$

$$(K_{02} 2^{-1} + K_{02} 2^{-2}) (a_0 2^0 + a_1 2^1 + a_2 2^2)$$

$$= [(K_{12} \lor K_{02})2^0 + (K_{11} \lor K_{01})2^{-1} + (K_{22} \lor K_{02})2^{-1} +$$

$$(K_{21} \lor K_{01})2^{-2} + K_{22} 2^{-1} + K_{01} 2^{-2}] \times$$

$$[a_0 2^0 + a_1 2^1 + a_2 2^2]$$

Because the coefficients of $K_2$ are associated with a higher order than those of $K_1$ in the last line, the puls sign is eliminated in the binary system and they can be adjacently written. A $3 \times 4$ multiplier is thus obtained.

Figure 4B:
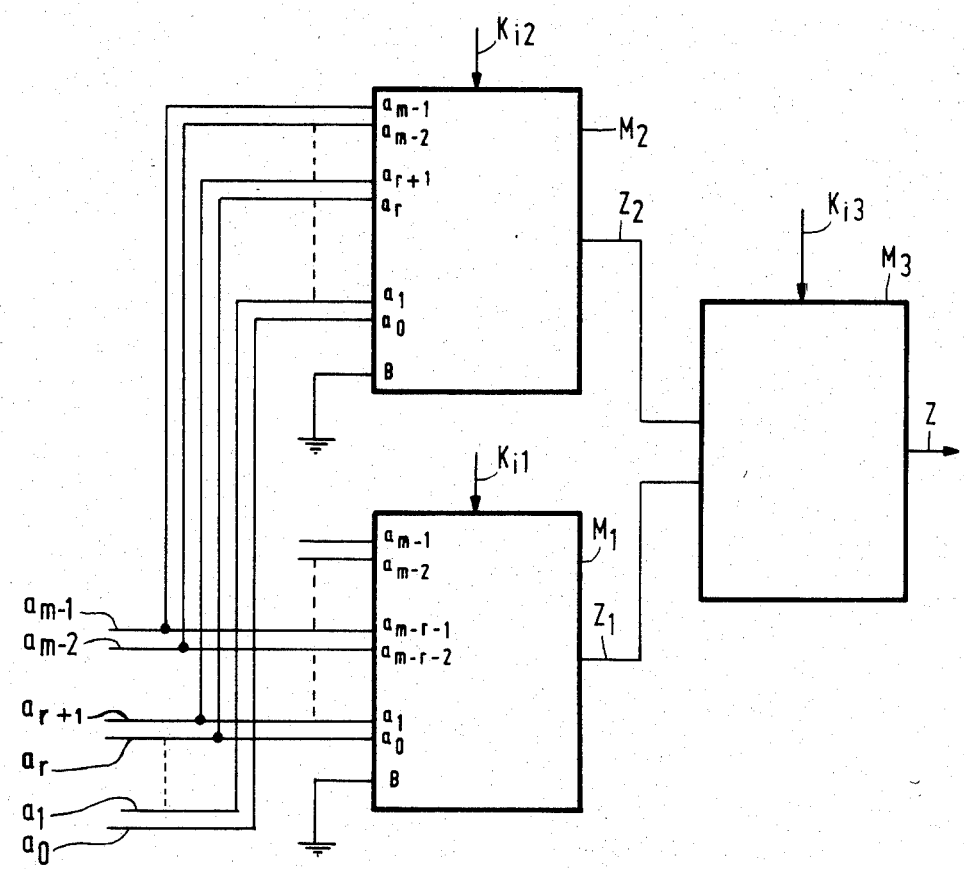
FIG. 4b shows an embodiment of an $m \times (m+r)$ multiplier.

Analogously, an $m \times (n+1r)$ bit multiplier can be realized by utilizing several matrix circuits. FIG. 4b shows an example of an $m \times (n+r)$ bit multiplier. Therein the r least-significant bits of the input signal are not applied to the matrix circuit $M_1$. To the input $a_o$ of the matrix circuit $M_1$ there is presented the coefficient $a_r$ of the input signal A, to the input $a_1$ the coefficient $a_{r+1}$ etc., the coefficient $a_{m-1}$ being presented in the customary manner. Due to the shifting of r bits in the input signal for the matrix circuit $M_1$ and the use of all inputs of $M_2$ for A, the output signal Z produces an $m \times (n+r)$ bit signal on an output of $M_3$.

(3) The matrix circuit can also be used as a multiplexer.

Figure 5:
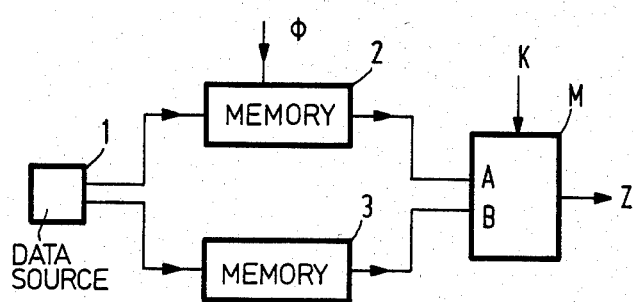
FIG. 5 shows an example of the use of the matrix circuit as a multiplexer.

FIG. 5 shows an example of the use of the matrix circuit as a multiplexer. It comprises, for example, a data source (1) which operates at a clock frequency which equals the clock frequency of the matrix circuit M, for example, 35 MHz. The elements 2 and 3 are, for example, memories which operate at half the clock frequency, that is to say 17.5 MHz in this case. Operating the memories 2 and 3 with a frequency which equals half the frequency of the clock signal of the matrix circuit, and imparting alternately the value 0 (all $K_i = 0$) and 1 (all $K_i = 1$) to K enables time multiplexing, that is to say with two words of m bits each.

For $K = 1$, $Z = KA + (1 - K) B$ $$Z = A + OB = A$$

For $K = 0$, $Z = OA + (1 - O)B = B$.

On the output Z, alternatively A or B is then available; this corresponds to the output signal of the memory 2 and the output signal of the memory 3, respectively.

(4) The matrix circuit can also be used as a digital mixer. As a result of function $Z = KA + (1-K) B$ realized, fractions of the input quantities A and B are mixed.

It is also possible to increase the resolution of K by means of a limited number of bits. The use of several matrix circuits offers a solution in this respect.

Figure 6A:
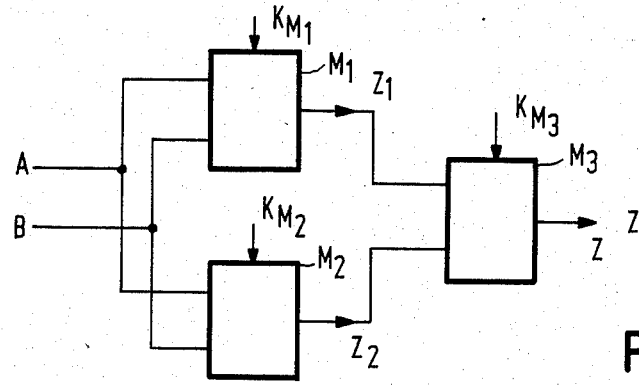
FIGS. 6a and 6b show examples of a digital mixer composed of a plurality of matrix circuits.

FIG. 6a shows how the resolution can be increased from $2^{-n}$ to $2^{-n-1}$ by means of a second electronic device according to the invention and using three matrix circuits. The following assumptions are made by way of example $$K_{M1} \text{ n-bits } K_{M1} = (K_{M1} \lor K_{M10}) 2^{-1} + \ldots + K_{M10} 2^{-n}$$

$$K_{M2} \text{ 2-bits } K_{M2} = (K_{M21} \lor K_{M20}) 2^{-1} +$$

$$(K_{M22} \lor K_{M20}) 2^{-2} + K_{M20} 2^{-2}$$

$$K_{M3} \text{ 2-bits } K_{M3} = (K_{M31} \lor K_{M30}) 2^{-1} +$$

$$(K_{M32} \lor K_{M30}) 2^{-2} + K_{n30} 2^{-2}$$

$M_1$, $M_2$ and $M_3$ are matrix circuits. Like for the use of matrix circuits as an adder, $K_{M3} = \frac{1}{2}$ ($K_{M31} = 1$) is again chosen. Furthermore, two possibilities are used for $K_{M2}$, being $K_{M2} = 1$ and $K_{M2} = 0$ (all $K_{M20} = 1$ and all $K_{M21} = 0$, respectively). If $K_{M2} = 0$, the result on the output of $M_2$ will be:

$$Z_2 = K_{M2}A + (1 - K_{M2})B = B$$

The result on the output of $M_1$ will be:

$$Z_1 = K_{M1}A + (1 - K_{M1})B$$

The final result on the output $M_3$ will then be:

$$Z = \tfrac{1}{2} Z_1 + \tfrac{1}{2} Z_2$$

$$= \tfrac{1}{2} K_{M1} A + \tfrac{1}{2} (1 - K_{M1}) B + \tfrac{1}{2} B$$

$$= \frac{K_{M1}}{2} A + \left(1 - \frac{K_{M1}}{2}\right) B$$

Similarly, if $K_{M2} = 1$ $$Z_2 = A$$

and $Z = 1/2\, K_{M1} A + 1/2 (1 - K_{M1}) B + 1/2 A$ $$Z = 1/2\, (K_{M1} + 1) A + 1/2 (1 - K_{M1}) B.$$

This is elaborated for $K_{M1} = 2$ bits in FIG. 6c. FIG. 6c shows how the results of the output signal $Z_1$ of the matrix circuit $M_1$, being $2^{-2} = \tfrac{1}{4}$, now has become $$\frac{1}{2^{2+1}} = \frac{1}{2^3} = \frac{1}{8}$$

for the output signal Z of the matrix circuit $M_3$.

Figure 6B:
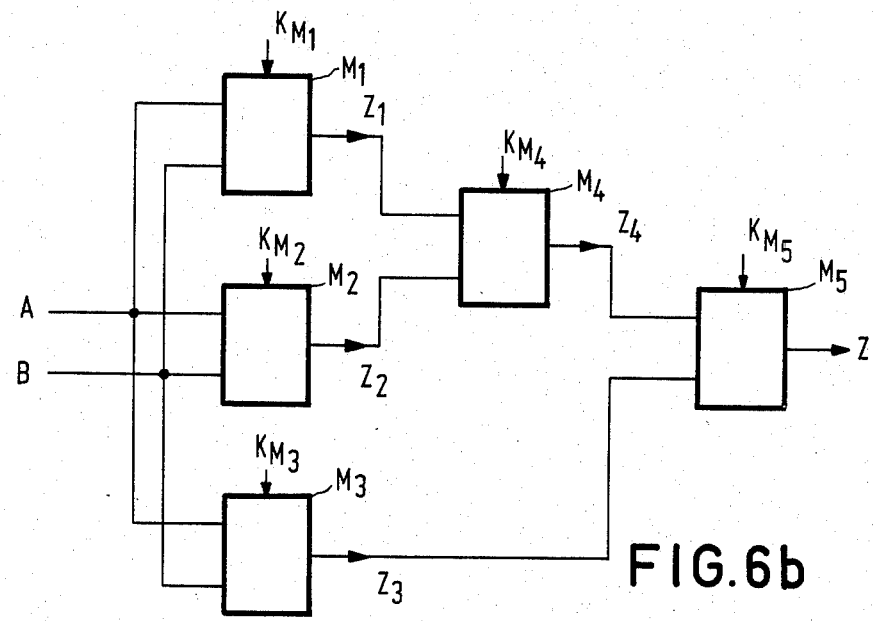

The resolution can be further increased by using even more matrix circuits. FIG. 6b shows how the resolution can be increased from $2^{-n}$ to $2^{-n-r}$ by means of a set-up which is analogous to the one described with reference to FIG. 6a. In this example, five matrix circuits $M_1$ to $M_5$ are used. If the output signal $Z_1$ of the matrix circuit $M_1$ has a resolution of $2^{-n}$ ($K_{M1}$ n bits) and the output signals $Z_1$ and $Z_2$ of the matrix circuits both have a resolution 1 ($K_{M2}$ and $K_{M3}$ both 1 bit) and if $K_{M4}$ and $K_{M5}$ are both 2 bits, the output signal Z of the matrix circuit $M_5$ will be:

$$Z = \tfrac{1}{2} Z_3 + \tfrac{1}{2} Z_4$$

$$Z = \tfrac{1}{2} Z_3 + \tfrac{1}{2} [\tfrac{1}{2} Z_1 + \tfrac{1}{2} Z_2]$$

$$Z = \tfrac{1}{2} <{}^A_B + \tfrac{1}{2} \left[ \tfrac{1}{2} \left( \tfrac{K'}{2^n} A + \left(1 - \tfrac{K'}{2^n}\right) B \right) + \tfrac{1}{2} <{}^A_B \right]$$

where $0 \leq K' \leq 2^n$ and where $<{}$ stands for A or B $$Z = \tfrac{1}{2} <{}^A_B - \tfrac{1}{4} \left[ \tfrac{K'}{2^n} A + \left(1 - \tfrac{K'}{2^n}\right) B \right] + <{}^A_B$$

Now, $$\tfrac{1}{4} \cdot \tfrac{1}{2^n} = \tfrac{1}{2^{n+2}},$$

which is the resolution of Z.

The use of more bits for the various $K_{M_i}$ values of the various matrix circuits $M_i$ as shown in FIGS. 6a and 6b also enables an increase of the resolution. It is to be noted again that this summary of possibilities is nonexhaustive.

The second stage of the second electronic device shown in FIG. 6b has two substages (Q=2) each containing each a matrix circuit, namely $M_4$ for the first substage and $M_5$ for the second substage. However the more matrix circuits there are in the first stage, the more substages there will be required in the second stage, because a matrix circuit of a first substage of the second stage can only add the output signal Z of two matrix circuits of the first stage. The number Q of substages of said second stage is given by: $2^{Q-1} < N \leq 2^Q$ where N is the number of matrix circuits of the first stage. In FIG. 6b matrix circuit $M_4$ can only add the output signal $Z_1$ of matrix circuit $M_1$ to the output signal $Z_2$ of matrix circuit $M_2$. So when there are N ($N \geq 2$) matrix circuits in the first stage, then there should be an integer number I of matrix circuits in the first substage of the second stage, said number I being determined by $(N/2 - 1) < I \leq N/2$. In the example of FIG. 6b where N=3, I=1 because $3/2 - 1 < 1 \leq 3/2$. A j-th ($1 \leq j \leq I$) matrix circuit ($M_4$) of the first substage has its first input connected to the output of a (2j−1)-th matrix circuit ($M_1$) of the first stage and its second input connected to the output of a (2j)-th matrix circuit ($M_2$) of the first stage. In case that N is an odd number, as example illustrated in FIG. 6b, than the output of the (2j+1)-th matrix circuit ($M_3$) is connected to a first (or second) input of a matrix circuit ($M_5$) of a further substage.

When the number Q of substages is larger than one (Q>1), then a q-th ($2 \leq q \leq Q$) substage comprises a number P of matrix circuits which is determined by $(H/2 - 1) < P \leq H/2$ in case that H, which gives the number of matrix circuits of the (q−1)-th substage, is larger than 1 (H>1). The connection between the H matrix circuits of the (q−1)-th substage and the P matrix circuits of the q-th substage is realized analogous to the connection of the matrix circuits of the first stage to the one of the first substage of the second stage. In case that H=1, as in FIG. 6b, than the q-th (second) substage only comprises one matrix circuit ($M_5$). A first input of that matrix circuit $M_5$ is connected to the output $Z_4$ of matrix circuit $M_4$ and a second input to the output $Z_3$ of matrix circuit $M_3$.

Figures 7A, 7B:
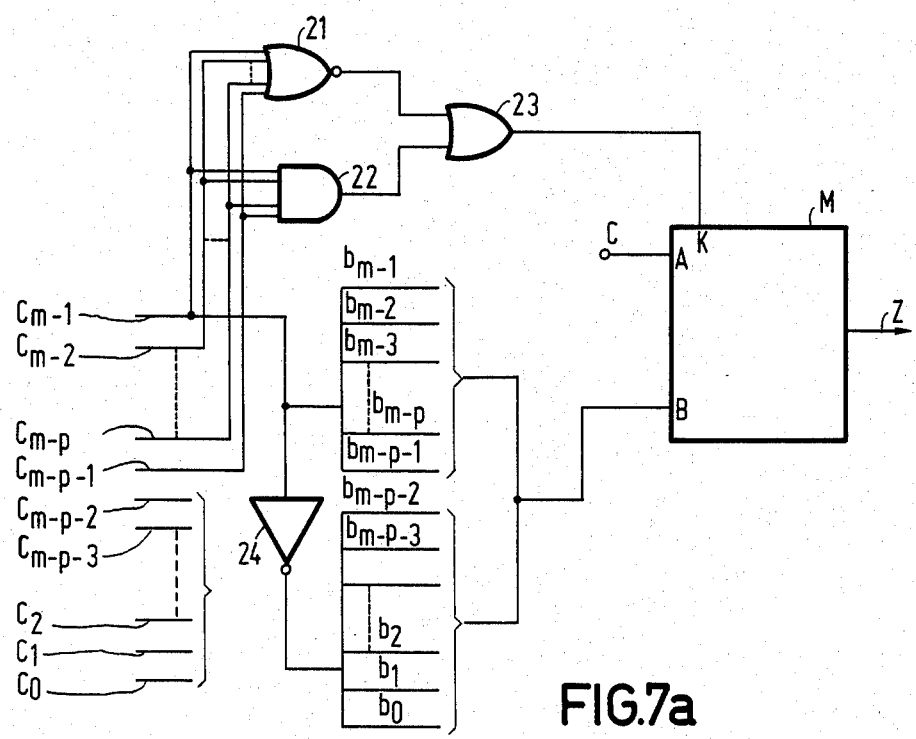
FIG. 7a shows a limiter which uses a matrix and FIG. 7b shows a table with the composition of a "limited signal"

(5) A limiter is a further application of the matrix circuit. The use of a matrix circuit enables a changeover from an m bit representation (in the two's complement representation) of a given quantity to an (m−p) bit ($p \in \mathbb{N}$) representation of said quantity. This possibility is illustrated in the FIGS. 7a and 7b.

One bit suffices for the weighting factor K; K=1 or 0. If several bits are available for K, it suffices to use, for example, only $K_o$ and to connect all other $K_i$ to ground. The least significant bits of an input signal C ($C_0, C_1 \ldots C_{m-p-r}$) are applied without modification to the input A of the matrix circuit ($M_1$), because their value is identical in both representations. The procedure for the most significant bits ($C_{m-p-1} \ldots C_{m-1}$) will be described hereinafter for the various cases.

(a) $C_{m-1}=0$, $C_{m-2}=0, \ldots, C_{m-p-1}=0$ As a result of the inverting OR-gate (21) and the OR-gate (23), K=1.

On the output of the matrix circuit (M), the value $Z = 1 \cdot A + 0 \cdot B = A$ is output, which in this case corresponds to $$A = C[C_0, C_1, \ldots, C_{m-p-1}]$$

(b) $C_{m-1}=0$; $C_{m-2} \ldots C_{m-p-1}$ are "0" or "1", but not all "0".

On the output of the inverting OR-gate 21: "0"
On the output of the AND-gate 22: "0"
On the output of the OR-gate 23: "0"
Thus, K=0.

The value $Z = 0 + 1 \cdot B = B$ will then be output on the output of the matrix circuit (M). The input value B is composed by taking the bit value of $C_{m-1}$, being the most significant bit of C which indicates the sign in this two's complement representation, for the bits $b_{m-1}, \ldots b_{m-p-1}$. Thus, the most significant bit $b_{m-p-1}$ again denotes the sign in this (m−p) bit representation. Because $C_{m-1}=0$, $b_{m-1} \ldots = b_{m-p-1}=0$. The other bits, being $b_0, \ldots b_{m-p-2}$, all have the inverse value of $C_{m-1}$. This is realized by presenting the signal of $C_{m-1}$ to the input of the inverting gate (24). The output of the inverting gate (24) is connected to the inputs $b_0, \ldots b_{m-p-2}$ of B. Because $C_{m-1}=0$, $b_0 = b_1 = \ldots = b_{m-p-2}=1$. The maximum value in (m−p) bit representation is then output on the output Z of the matrix circuit (M). The latter was to be expected, because the value "1" occurs in the most significant bits $C_{m-1}, \ldots C_{m-p-1}$ of the positive ($C_{m-1}=0$) input signal C.

(c) $C_{m-1}=1$; $C_{m-2}, \ldots C_{m-p-2}$ are "0" or "1", but not all "1".

On the output of the inverting OR-gate 21: "0"
On the output of the AND-gate 22: "0"
On the output of the OR-gate 23: "0"
Thus, K=0 and Z=B. For the remainder, the procedure is as described sub (b). Only the values of the $b_i$ bits are different, because $C_{m-1}=1$.

$$b_{m-1} = \ldots = b_{m-p-1} = \text{``1''}$$

$$b_{m-p-2} = \ldots = b_0 = \text{``0''}$$

The minimum value in (m−p) bit representation is then output on the output Z of the matrix circuit (M). The latter was also to be expected, because the value "1" occurs in the most significant bits $C_{m-1}, \ldots C_{m-p-1}$ in the negative ($C_{m-1}=1$) input signal C.

(d) $C_{m-1} = C_{m-2} = \ldots = C_{m-p-1} = 1$
On the output of the inverting OR-gate 21: "0"

On the output of the AND-gate 22: "1"
On the output of the OR-gate 23: "1"
Thus, K=1 and Z=A, which again means A=C.

(6) The matrix circuit offers a favourable solution for the design of recursive filters. Recursive filters are digital filters realized via a recursive relation, which means that the signal on the output of the filter is determined by a "weighted" sum of a signal applied to the input of such a filter element at the instant t and a feed back signal which has been delayed by a period $\tau$ with respect to the input signal.

Figure 8A:
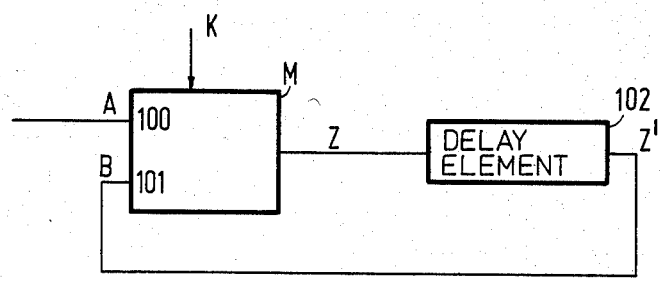
FIG. 8a shows an example of the design of a recursive filter using a matrix circuit.

FIG. 8a shows an example of a design of a recursive filter utilizing a matrix circuit. The matrix circuit (M) has an output signal $Z'=KA+(1-K)B$, so that it is suitable for the design of a recursive filter. A "weighted" sum $K(t) A(t)+(1-K(t)) B(t)$ is presented as an output signal by supplying the one input (100) of the matrix circuit (M) with the input signal A(t) and the other input (101) with the fed back delayed output signal $Z(t-\tau)$ as the input signal B(t) at the instant t. Thus, at the instant t, on the output of the matrix circuit (M)

$$Z(t)=K(t)A(t)+(1-K(t))Z'(t) \quad (10)$$

in which Z'(t) is the output signal of the delay element 102 with a delay $\tau$. Thus, $$Z'(t)=Z(t-\tau) \quad (11)$$

Substitution of (10) in (11) offers $$Z'(t)=K(t)A(t-\tau)+(1-K(t))Z'(t-\tau) \quad (12)$$

When use is made of the z-transformation (z-transformation is described in the article by L. Rabiner et al, IEEE trans. Vol. AU-20, December 1972, page 323):

$$\begin{cases} Z'(t-\tau) = Z'(t)Z^{-n} \\ A(t-\tau) = A(t)Z^{-n} \end{cases} \quad (13)$$

Substitution of (13) in (12) gives:

$$Z'(t) = KA(t)z^{-n} + (1-K)Z'(t)z^{-n}$$

$$Z'(t) = [1 + (K-1)z^{-n}] = KA(t)z^{-n}$$

$$\frac{Z'(t)}{A(t)} = \frac{Kz^{-n}}{1 + (K-1)z^{-n}}$$

Therefrom, the transfer function follows for a recursive filter:

$$H(z) = \frac{Kz^{-n}}{1 + (K-1)z^{-n}}$$

Figure 8B:
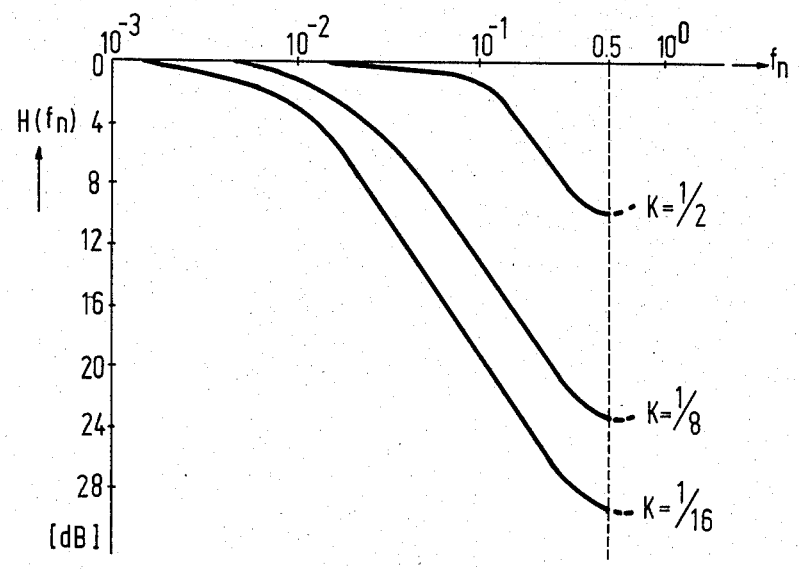
FIG. 8b shows a graph of the transfer function $H(f_n)$ as a function of the standardized frequency $f_n$ for a variable bandwidth digital filter.

Because the K value associated with the matrix circuit can vary, the bandwidth of the recursive filter can thus be varied. In FIG. 8b, H ($f_n$) is given as a function of $f_n$, being the normalized frequency $f_n = f/f_{clock}$, for a number of values of K.

What is claimed is:

1. An electronic device for executing on three digital variables (A, B, K) a mathematical operation of the kind $KA+(1-K)B$, said electronic device comprising:
    first and second input means for receiving a first (A) and a second (B) m-bits (m≧0) input signals representing two of said three digital variables, and third input means for receiving an (n+1)-bits (n>0) weighting factor signal K representing the third digital variable;
    at least n logic gates, an $i^{th}$ logic gate ($G_i$) (1≦i≦n) having a first input for receiving the $i^{th}$ bit coefficient value ($K_i$) of said weighting factor signal, each of said logic gates being a second input for receiving the zero order bit coefficient value ($K_{00}$) of said weighting factor signal, said $i^{th}$ logic gate ($G_i$) being provided for generating and presenting at an output thereof a weighting signal $K_{0i}=K_i \vee K_{00}$, (where V stands for the mathematical "OR");
    (n+1) x m electronic circuits (Y) which are arranged as the elements of an (n+1) by m matrix, a matrix element $Y_{i'j}$ of the $j'^{th}$ column (1≦j'≦m) and the $i'^{th}$ row (2≦i'≦n+1) (or vice versa) having a first and a second input for receiving the $j^{th}$ ($a_j$ and $b_j$, 0≦j≦m−1) bit coefficient values of said first and said second input signals, and a third input connected to the output of a respective logic gate for receiving said weighting signal $K_{0i}$ (i=i'−1), the matrix elements of a first row (i'=1) having a third input for receiving the zero order bit coefficient ($K_{00}$) of said weighting factor signal, each of said electronic circuits being provided for generating a partial output signal by executing the mathematical operation $Y_{ij}=K_{0i''}a_j+(1-K_{0j''})b_j$ (o≦i''≦n) on the bit coefficient values presented at its inputs, each of said electronic circuits having an output for supplying said partial output signal, the outputs of said electronic circuits are connected to inputs of full adders which serve to sum all said partial output signal and for generating a digital output signal of the value $Z=KA+(1-K)B$; and
    an output means for supplying said digital output signal.

2. An electronic device as claimed in claim 1, wherein for use as an adder the value of said weighting factor signal is set to $K=\frac{1}{2}$.

3. An electronic device as claimed in claim 1, wherein for use as an m×n bit multiplier for multiplying a first one of said input signals with said weighting factor signal, said electronic device comprises means for setting the second one of said input signals equal to zero.

4. An electronic device as claimed in claim 1, wherein for use as a multiplexer, said electronic device being provided with alternating means for alternately presenting each of the extreme values i.e. K=0, K=1 of the weighting factor signal to said third input means of the electronic device.

5. An electronic device as claimed in claim 1, wherein for use as a limiter said first input signal being formed by the signal to be limited which signal is in two's complement form, said electronic device comprises deriving means for deriving the second input signal from the signal bit coefficient of the first input signal, and setting means for setting the weighting factor K to 1 or 0 in dependence upon whether the coefficients of the most-significant bits of the first input signal are all equal or not all equal, respectively.

6. An electronic device as claimed in claim 1, wherein for use as a variable bandwidth recursive digital filter, said output means being connected to an input of a time delay element, the output of said time delay being connected to said second input means.

7. An electronic device as claimed in any one of the claims 1 to 6, wherein said electronic device is manufactured according to the integrated circuit technique.

8. An electronic device as claimed in any one of the claims 1 to 6, wherein said electronic device is manufactured according to the NMOS technology.

9. A second electronic device for executing on sets of three digital variables $(A_p, B_p, K_p), \ldots$, a first mathematical operation of the kind $K_p A_p + (1 - K_p) B_p$, and a second mathematical operation of the kind $\Sigma_p K_p A_p + (1 - K_p) B_p$, said second electronic device being stagewise organized and comprising a first stage for the execution of said first mathematical operation and a second stage for the execution of said second mathematical operation, said first stage comprising a plurality of dedicated first electronic devices, each of said dedicated first electronic devices comprising:

first and second input means for receiving a first $(A_p)$ and a second $(B_p)$ m-bits ($m \geq 0$) input signal representing two of said three digital variables of one set, and third input means for receiving an $(n+1)$-bits ($n \geq 0$) weighting factor signal $(K_p)$ representing the third digital variable of said one set;

at least n logic gates, an $i^{th}$ logic gate $(G_i)$ ($1 \leq i \leq n$) having a first input for receiving the $i^{th}$ bit coefficient value $(K_{pi})$ of said weighting factor signal, each of said logic gates having a second input for receiving the zero order bit coefficient value $(K_{00})$ of said weighting factor signal, said $i^{th}$ logic gate $G_i$ being provided for generating and presenting at an output thereof a weighting signal $K_{p0i} = K_{pi} \vee K_{00}$, (where V stands for the mathematical "OR");

$(n+1) \times m$ electronic circuits which are arranged as the elements of an $(n+1)$ by m matrix, an electronic circuit $Y_{i,j}$, positioned at the $j'^{th}$ column ($1 \leq j' \leq m$) and the $i'^{th}$ row ($2 \leq i' \leq n+1$) (or vice versa) of said matrix having a first and a second input for receiving the $j^{th}$ ($a_{pj}$ and $b_{pj}$, where $0 \leq j \leq m-1$) bit coefficient values of said first and said second input signal, and a third input connected to the output of a logic gate for receiving said weighting signal $K_{p0i}$, the matrix elements of a first row ($i' = 1$) having a third input for receiving the zero order bit coefficient ($K_{00}$) of said weighting factor signal, each of said electronic circuits being provided for generating a partial output signal by executing the mathematical operation $Y_{ij} = K_{p0i}{''} \, a_{pj} + (1 - K_{p0i}{''}) \, b_{pj}$ where $0 \leq i{''} \leq n$ on the bit coefficient values presented at its inputs, each of said electronic circuits having an output for supplying said partial output signal, the outputs of said electronic circuits are connected to inputs of full adders which serve to sum all said partial output signal and for generating a digital output signal of the value $Z_p = K_p A_p + (1 - K_p) B_p$;

an output means for supplying said digital output signal; said second stage comprises adder means for the execution of said second mathematical operation, said output means of said first dedicated electronic devices being connected to respective inputs of said adder means.

10. A second electronic device as claimed in claim 9, wherein said second stage comprises a first integer number Q ($Q \geq 1$) of substages, said first stage comprising a second integer number N ($N \geq 2$) of dedicated first electronic devices;

a first ($q = 1$) substage of said first number of substages comprises for use as an adder a third integer number I of dedicated first electronic devices, which third integer number being determined by $(N/2 - 1) < I \leq N/2$, a j-th ($1 \leq j \leq I$) dedicated first electronic device of said first substage having its first input means connected to the output means of a $(2j-1)$-th dedicated first electronic device of said first stage and its second input means connected to the output means of a $(2j)$-th dedicated first electronic device of said first stage, and in case that N is an odd number the $(2j+1)$-th dedicated first electronic device of said first stage having its output means connected to the first (or second) input means of a dedicated first electronic device of a further substage, said weighting factor signal inputted at the third input means of the I dedicated first electronic devices of said first substage being set to a first fixed value;

a q-th ($2 \leq q \leq Q$) substage of said first number of substages comprises for use as an adder a fourth integer number P of dedicated first electronic devices, which fourth integer number P of dedicated first electronic devices being determined by $(H/2 - 1) < P \leq H/2$ wherein H is the number of dedicated first electronic devices of the $(q-1)$-th substage, H being larger than 1 ($H > 1$), a p-th ($1 \leq p \leq P$) dedicated first electronic device of said q-th substage having its first input means connected to the output means of a $(2p-1)$-th dedicated first electronic device of said $(q-1)$-th substage and its second input means connected to the output means of a $(2p)$-th dedicated first electronic device of said $(q-1)$-th substage, in case that H is an odd number the $(2p+1)$-th dedicated first electronic device of the $(q-1)$-th substage having its output means connected to the first (or second) input means of a dedicated first electronic device of the $(q+1)$-th or a further substage said weighting factor signal inputted at the third input means of the dedicated first electronic devices of said q-th substage being set to a respective second fixed value.

11. A second electronic device as claimed in claim 10, wherein said first and second second fixed value are equal to $\frac{1}{2}$.

12. A second electronic device as claimed in claim 9, 10 or 11 wherein for use as a $(m - 1r) \times (n + 1r)$ bit multiplier ($1 \in \mathbb{N}$) there are provided first means for setting to zero one of the first or the second input signal of a set, the other input signal being the same for each set, and there are provided second means for applying said other input signal in such manner that the significance of said input signal increases by a value r from said dedicated first device to said dedicated first device.

13. A second electronic device as claimed in claim 9, 10, 11 wherein for use as a digital mixer said first and second input signals being the same for each set.

14. A second electronic device as claimed in claims 9, 10, or 11 wherein said second electronic device is manufactured according to the integrated circuit technique.

15. A second electronic device as claimed in claims 9, 10 or 11 wherein said second electronic device is manufactured according to the NMOS technology.

* * * * *